US00RE34673E

United States Patent [19]

Desbiens

[11] E Patent Number: Re. 34,673

[45] Reissued Date of Patent: Jul. 26, 1994

[54] TWO LEVEL SCRATCH GAME

[75] Inventor: Jean P. Desbiens, Montreal, Canada

[73] Assignee: Les Technologies Babn Inc., Montreal, Canada

[21] Appl. No.: 44,606

[22] Filed: Apr. 9, 1993

Related U.S. Patent Documents

Reissue of:

[64] Patent No.: 5,074,566
Issued: Dec. 24, 1991
Appl. No.: 563,353
Filed: Aug. 7, 1990

[51] Int. Cl.[5] ..... A63F 3/06

[52] U.S. Cl. ..... 273/269; 273/139

[58] Field of Search ..... 273/138 R, 139, 240, 273/269, 307

[56] References Cited

U.S. PATENT DOCUMENTS

| | | | |
|---|---|---|---|
| 3,290,812 | 12/1966 | Hunkins | 273/139 |
| 3,493,230 | 2/1970 | Curzon | 273/139 |
| 4,252,322 | 2/1981 | Orter | 273/269 |
| 4,466,614 | 8/1984 | Bachman et al. | 273/139 |
| 4,619,457 | 10/1986 | Small | 273/269 |
| 4,655,461 | 4/1987 | Capri et al. | 273/269 X |
| 4,775,155 | 10/1988 | Lees | 273/139 |
| 4,943,090 | 7/1990 | Fienberg | 273/139 |

*Primary Examiner*—William Stoll
*Attorney, Agent, or Firm*—Foley & Lardner

[57] ABSTRACT

A two-level scratch game is disclosed which comprises a substrate on which is printed a first grid of randomly, selected numbers, each number being printed in a separate box which forms part of the grid. At least one instant price in the form of a price amount or of a game symbol is printed in at least one of the boxes of the first grid. A scratchable rub-off coating is applied onto the first grid to hide the numbers and instant prices printed in the boxes of this first grid. A second grid identical in size to the first grid and containing the same randomly selected numbers is printed on the rub-off coating exactly over the first grid. In use, a player owning the game will benefit from two levels of playing activity upon a drawing of numbers at random by an authorized authority, namely (1) to try to get a complete horizontal, vertical or diagonal row of numbers as in a Bingo game in order to win a given price, and simultaneously (2) to scratch the boxes containing the drawn numbers in order to find and win an instant price. A method of manufacturing this two-level scratch game is also disclosed.

25 Claims, 3 Drawing Sheets

TWO LEVEL SCRATCH GAME

Matter enclosed in heavy brackets [ ] appears in the original patent but forms no part of this reissue specification; matter printed in italics indicates the additions made by reissue.

BACKGROUND OF THE INVENTION a) Field of the Invention

The present invention relates to a two-level scratch game to be used and sold in a lottery. The invention also relates to a method of manufacturing this two-level scratch game.

b) Brief Description of the Prior Art

Scratch games comprising a substrate on which a scratchable rub-off coating is applied in order to hide instant prices in the form of a price amount, or a game symbol which is printed directly onto the substrate, are well known and commonly used by lotteries and advertising companies for promotional purposes. With such scratch games, the play essentially consists of scratching the rub-off coating or a part thereof in order to hopefully find that one of the instant prices has been printed on the substrate. If an instant price is found, the possessor of the scratch piece wins that amount.

A game called Bingo is also well known. This game makes use of cards on which two dimensional grids *form individual boxes. Each box has a* randomly selected number printed therein[part]. Bingo random numbers are drawn by some authority. A player marks the corresponding numbers on their card. In trying to get a complete horizontal, vertical or diagonal row of the numbers marked. When a player accomplishes this objective, they win a price amount that is usually predetermined before the drawing of numbers starts.

Another scratch game derived from the Bingo game has already been suggested and is presently marketed in France under the tradename GROLO. This game comprises a substrate on which has a first grid of boxes printed thereon, containing winning or losing symbols which are randomly distributed. This first grid is hidden by a scratchable rub-off coating upon which another grid is printed and superimposed over the first grid. This second grid contains numbers sequentially printed in its boxes to allow identification of the boxes. In use, a plurality of numbers are drawn at random by some authority. Then, each player scratches the rub-off coating of the boxes bearing the numbers that are drawn in order to uncover the symbols printed within the corresponding boxes of the first grid. If a given number of winning symbols are uncovered, the player will win a specific price amount.

The second grid of numbers printed on the rub-off coating of all of these games is always the same, and only the first grid of randomly selected winning and losing symbols vary from one card to the other. In addition, there is only a single way of playing this scratch game.

OBJECTS OF THE INVENTION

A first object of the present invention is to provide a two-level scratch game which combines two of the above mentioned games, namely the instant scratch game and the Bingo game, thereby allowing a player to benefit from two levels of playing activity within the same game.

Another object of the present invention is to provide a method of manufacturing such a two-level scratch game.

SUMMARY OF THE INVENTION

More particularly, the present invention provides a two-level scratch game comprising:

- a substrate;
- a first grid of randomly selected numbers printed onto the substrate, each number being printed in a separate box which forms part of the first grid;
- at least one instant price in the form of either a price amount or of a game symbol which is printed in at least one of the boxes of the first grid;
- a scratchable rub-off coating applied over the first grid to hide the numbers and at least one instant price printed in the boxes of this first grid; and
- a second grid which is identical in size to the first grid and which contains the same randomly selected numbers, this second grid being printed on the rub-off coating in a position which is exactly over the first grid and containing the very same numbers in its boxes as the first grid.

In use, a player owning the game will benefit from two levels of playing activity during the drawing of numbers at random by some authority. That is, the player will try to get a complete horizontal, vertical or diagonal row of numbers as in a Bingo game in order to win a specific price while simultaneously trying to scratch the boxes containing the drawn numbers in order to find and win an instant price.

Preferably, the substrate is a card, and the first and second grids are two dimensional in shape and comprise a plurality of rows and a plurality of columns.

Preferably also, the prices which can be won upon completion of a horizontal, vertical or diagonal row of numbers may be printed on the card which acts as the substrate.

Advantageously, the scratch game may also comprise at least one of the following security or control features:

- a hidden validation number printed on the card which is specific to the card, in order to permit authentification of the card and thus permit detection of any counterfeiting or alteration of the numbers, amounts or symbols printed on the card;
- an uncovered control number printed on the card for production control;
- dual numbers printed on the card to ascertain that the first and second grids printed on the card are identical; and
- a coded version of the hidden validation number which is in the form of bars having different thicknesses.

When the first and second grids have five columns, the word BINGO may be printed over the first and second grids in such a manner that each letter of this word is positioned above one of the five columns. This particular configuration is of a particular interest since it makes it possible, for the authority drawing the numbers, to call them as in a conventional Bingo game. That is, the authority can identify the column where each number being drawn can be found, by reciting a letter. Thus, for example, if the number being drawn, say, 5, is in the first column of both grids, the authority drawing this number will actually call it as "B-5".

The invention also provides a method of manufacturing the two-level scratch game as disclosed hereinabove.

The method according to the invention comprises the steps of:

printing a first grid of randomly selected numbers onto a substrate, each number being printed in a separate box forming part of the first grid;

printing onto the substrate at least one instant price in the form of a prize amount or of a game symbol in at least one of the boxes of the first grid;

applying a scratchable rub-off coating onto the first grid printed on the substrate to hide the numbers, and providing at least one instant price which is printed *on* one of the boxes of this first grid; and printing onto the rub-off coating a second grid identical in size to the first grid and containing the same randomly selected numbers.

The printings of the first and second grids are synchronized so that the second grid is printed exactly over the first grid and contains the very same numbers in its boxes, as *the* first grid.

Of course, this method may also contain the additional steps of providing on the card at least one of the above mentioned security and/or control features.

*In another aspect, the invention further provides a method for use in the manufacture of a scratch game, comprising the steps of:*

*printing a first grid of randomly selected numbers onto a substrate, each number being printed in a separate box forming part of the first grid;*

*applying a scratchable rub-off coating onto the first grid printed on the substrate to hide the numbers printed in the boxes of the first grid; and*

*printing onto said rub-off coating a second grid identical in size to the first grid and containing the same randomly selected numbers as the first grid,*

*wherein said printings of said first and second grids are synchronized so that the second grid is printed exactly over the first grid and contains the very same numbers in the very same boxes as the first grid.*

BRIEF DESCRIPTION OF THE DRAWINGS

The invention and the way it works will become apparent from the following non restrictive description of a preferred embodiment thereof, with reference to the accompanying drawings, in which.

DESCRIPTION OF THE PREFERRED EMBODIMENT OF THE INVENTION

Figure 1:
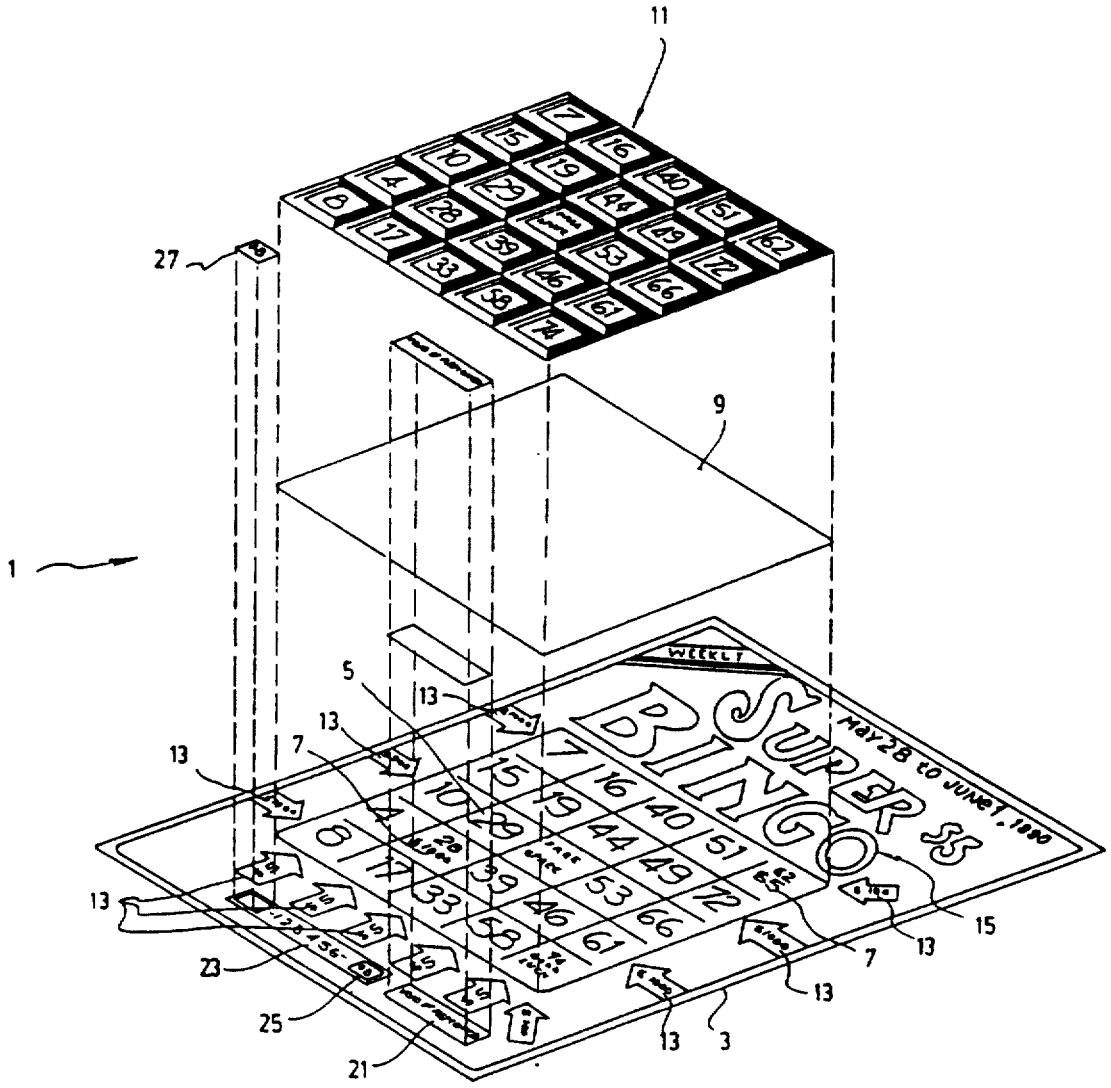
FIG. 1 is an exploded, perspective view of a two-level scratch game according to the invention.

The two-level scratch game 1, according to the invention and as shown in the accompanying drawings has a substrate 3 which is in the form of a card. The upper surface of the substrate 3 has a first grid 5 of randomly selected numbers thereon printed.

The first grid 5, is preferably bidimentional, and is similar to a traditional Bingo grid having five rows of five numbers ranging from 1 to 75 which are distributed over five columns. Each column has a specific range of numbers such as, for example, Nos. 1 to 5 in column 1, Nos. 16 to 30 in column 2, etc. Each number is printed in a separate box which is part of the grid and, each box is defined by the intersection of one column with one row. In addition to the randomly selected numbers, the first grid also contains instant prices 7 in the form of price amounts or of a game symbol printed in some of the boxes of the first grid 5. In the embodiment shown in the drawings, such instant prices are printed in the boxes containing numbers 28, 62 and 74.

After the boxes of the first grid 5 have been printed and filled in with random numbers and instant prices, a scratchable rub-off coating 9 is applied on top of the first grid 5 to hide the numbers and instant prices. Then, a second grid 11 which is identical in size to the first grid 5, and which contains the same randomly selected numbers as the first grid 5 is, are printed onto the rub-off coating after the rub-off coating is dried. Of course, the boxes of the second grid 11 only contain printed numbers and do not have any price amounts or game symbols printed therein.

In accordance with the invention, both the printing of the first and second grids 5, 11 are identical, except for the additional price amount and symbol printed game some of the boxes of the first grid 5. Thus, if a number, such as 7, is printed in the first box of the second grid 11 for example, the same number 7 will also be printed in the same box of the first grid 5.

As aforesaid, certain boxes of the first grid 5 contain, in addition to their numbers, a price amount to be won instantly by the player owning the game. Of course, the player is instructed on the back of the card to scratch only the boxes whose numbers are drawn.

The boxes containing a price amount or a game symbol, in addition to a number, form the instant portion of the game. Of course, several game designs can be used here, such as by way of example, "match two", "match three", collectable, and add-up of digits to beat a score. The play in this part of the game is essentially an instant "win" or "lose" concept as explained above.

The other portion or level of the game is derived from and is played in the same way as the traditional Bingo game. A player must get a complete horizontal, vertical or diagonal row of numbers in order to win a predetermined price that are preferably printed all around the grid (see the arrows 13).

Of course, the winning numbers must be drawn at random, using Bingo type drawing machines or any other similar means. When the game is used by a public lottery, the results may be published in the media, as is known in this particular field.

As described above, the player having the inventive game card will benefit from two-levels of activity upon the drawing of numbers by an authorized authority. Assuming, for example that a total of five numbers are drawn, one number a day for five days, each player will have to look for these numbers on their card(s) and will (1) try to get a complete horizontal, vertical or diagonal row of numbers as in a traditional Bingo game in order to win the price indicated by the arrow 13 and (2) will also have the opportunity every day to scratch the boxes containing the drawn number in order to find and win an instant price.

To make the game easier to play for those accustomed to the traditional Bingo game, capital letters such as those forming the word BINGO 15 may be printed on the card above the first and second grids 5 and 11, in such a manner that each letter of the word BINGO is positioned above one of the five columns of the grid. This makes each number being drawn easier to identify as was previously explained.

Figure 2:
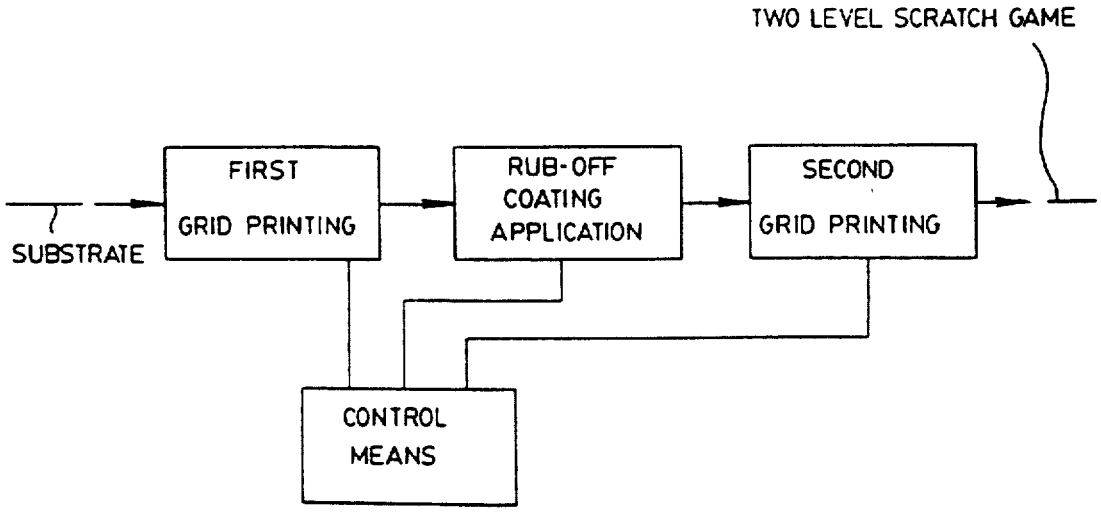
FIG. 2 is a flow chart of the method used for manufacturing this game.
Figure 4:
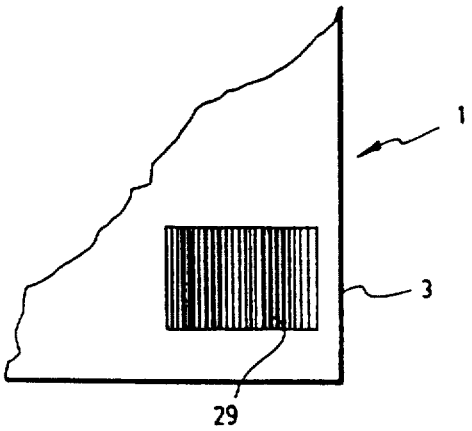
FIG. 4 appearing on the same sheet as FIG. 2, is a bottom plan view of a corner of the scratch game of FIGS. 1 and 3, showing the coded version of a validation number which is specific to the card and is in the form having bars of different thicknesses.

The two-level scratch game 1 disclosed hereinabove can be manufactured according to the flow chart shown in FIG. 2.

In a first step, the first grid 5 of randomly selected numbers can be printed together with the instant prices 7 onto each card, using a high speed ink jet printer driven by a computer to do so. This kind of equipment which is commonly used by lottery ticket manufacturers, permits the printing of a great numbers of tickets such as 50,000 or more. Usually, the price structure of the instant portion of the game is based on the random numbers which are chosen in generating the 50,000 tickets. This price structure/ticket correlation allows for a [reasonably] *reasonable* estimation of the price fund liability in relation to the numbers drawn.

In a second step, a thick layer of scratchable rub-off coating is applied onto the printed card.

In the third and last step, the second grid 11 is printed onto the rub-off coating, after the rub-off coating 3 has been dried, using the same kind of high speed ink jet printer as used in the first step.

In accordance with the invention, it is of course compulsory that printings of the first and second grids be synchronized by some control means so that the second grid 11 is printed exactly on top of the first grid 5 and contains the very same numbers in its boxes as the first grid 5. Once again, this kind of synchronized control means is usually incorporated into a computer and is known well.

If necessary, a simulated drawing of numbers can also be made on the computer in order to allow for a reasonably accurate estimation of the price fund liability of the Bingo portion of the card in relation to the numbers being drawn.

A plurality of security and control features may also be used with this game card.

First of all, a validation number (not shown) specific to each card and hidden by a thick layer of scratchable rub-off coating 21, may be printed onto the card to permit the authentification of the card and the detection any counterfeiting or partial alteration of the numbers, amounts or symbols printed on the card. The basic purpose of this validation number, which is unique to each card, and which is memorized by the computer when the computer randomly selects the number to be printed, is to allow the authority conducting the game to query the computer and to check whether the data appearing on the winning card are actually the true and real data that were printed onto a particular card.

A second feature that can be used with this card is to print an uncovered control number 23, whose purpose is essential to allow for production control. This control number may be unique game-wide, and may be used for description and quantitative controls.

Figure 3:
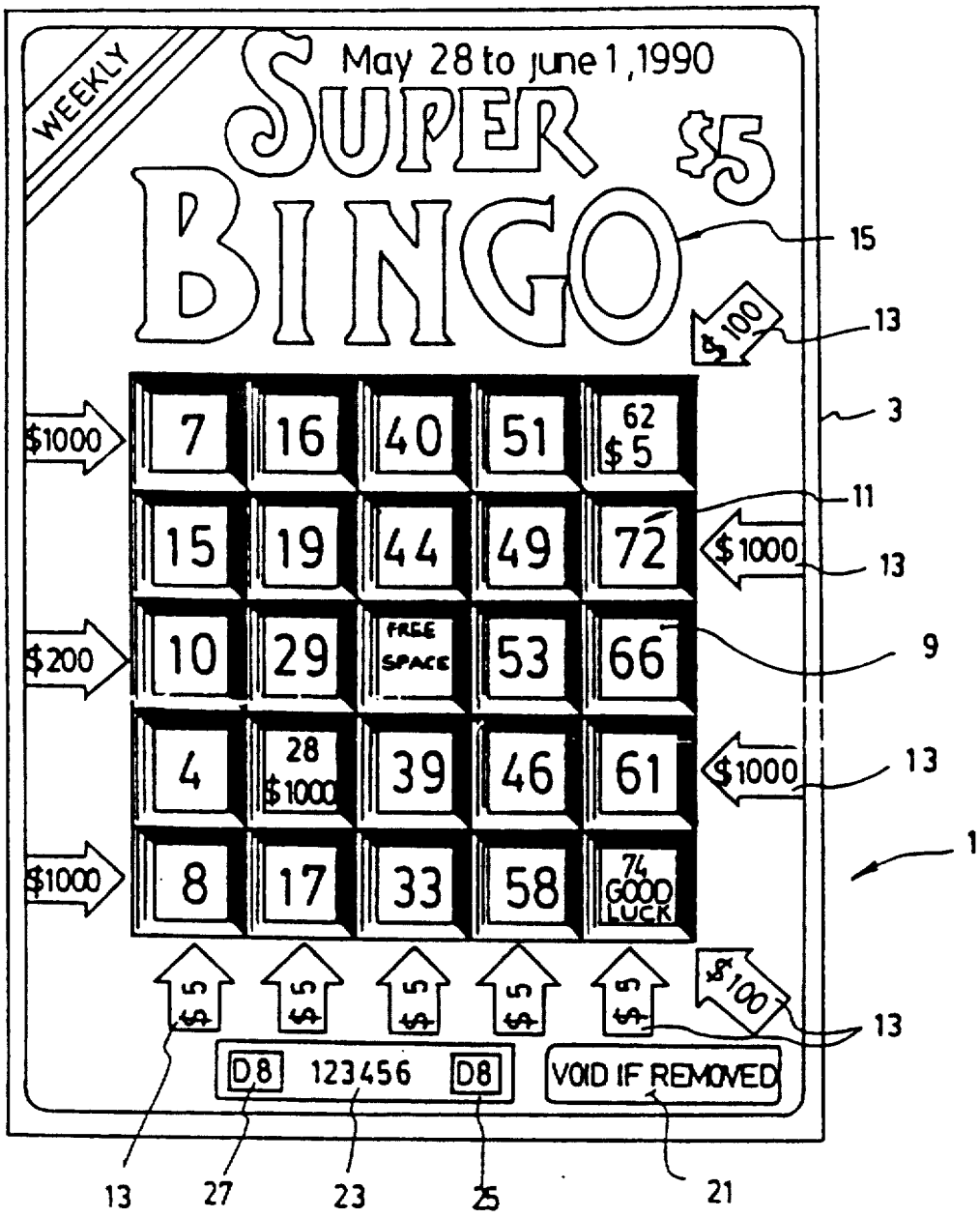
FIG. 3 is a top plan view of a two-level scratch game as shown in FIG. 1 which is ready for sale to a player.

A third feature that can be used with the game forming the subject matter of this invention is the dual numbering of the game card. In this feature, the same number is printed on the first and second grids to make sure that the synchronization was perfect when such printings were carried out and that the second grid was identical to the first one. By way of example, a three-digit number, or an alpha-numeric symbol such as D8 at 25 in FIGS. 1 and 3, may be printed on the card when the first grid 5 is printed thereon. Then, the same number or alpha-numeric symbol may be printed at 27 when the second grid is printed. Of course, a match in the numbers or alpha-numeric symbols printed at 25 and 27 is proof that both printings have been successfully synchronized.

A fourth security and control feature that may be used with the game according to the invention is the printing of a coded version of the validation number which is specific to the card and is in the form of bars of different thicknesses 29 which are on the back of each card [and is]. This feature facilitates the data entries in the computer by the paying agents who want to verify the authority of the card. Of course, this bar-code is a coded version of the validation number printed on the front of the card. An algorithm may be used to code this number in order to prevent the fraudulent verification of the card's status by a paying agent.

I claim:

1. A method of manufacturing a two-level scratch game, comprising the steps of:

printing a first grid of randomly selected numbers onto a substrate, each number being printed in a separate box forming part of the first grid;

printing onto the substrate at least one instant price in the form of a price amount or of a game symbol in at least one of the boxes of the first grid;

applying a scratchable rub-off coating onto the first grid printed on the substrate to hide the numbers and said at least one instant price printed in the boxes of the first grid; and printing onto said rub-off coating a second grid identical in size to the first grid and containing the same randomly selected numbers, wherein said printings of said first and second grids are synchronized so that the second grid is printed exactly over the first grid and contains the very same numbers in the very same boxes as said first grid.

2. The method of claim 1, wherein use is made of a card as said substrate, and wherein said first and second grids are two-dimensional and comprise a plurality of rows and a plurality of columns.

3. The method of claim 2, comprising the additional step of providing onto said card at least one of the following security and control features:

printing and hiding a validation number which is specific to said card in order to permit authenification of said card and thus permit the detection of any counterfeiting or partial alteration of the numbers, amounts or symbols printed on the card;

printing of an uncovered control number for production control;

dual numbering of the card with the same number during the printings of the first and second grids to make sure that the synchronization of said grids was perfect when such printings were carried out and that the second grid is identical to the first one; and printing of a coded version of a validation number which is specific to the card and in the form of bars of different thicknesses.

4. The method of claim 3, further comprising the additional steps of using first and second grids having five columns and printing over said first and second grids the word BINGO in such a manner that each letter of the word BINGO is positioned above one of said five columns.

5. The method of claim 2, further comprising the additional steps of using first and second grids having five columns and printing over said first and second grids the word BINGO in such a manner that each letter of BINGO is positioned above one of said five columns.

6. A two level scratch game comprising:

a substrate;

a first grid of randomly selected numbers printed onto the substrate, each number being printed in a separate box which forms part of the first grid;

at least one instant price in the form of a price amount or of a game symbol which is printed in at least one of the boxes of the first grid;

a scratchable rub-off coating applied onto the first grid which hides the numbers, and at least one instant price printed in the boxes of the first grid; and a second grid which is identical in size to the first grid and which contains the same randomly selected numbers as the first grid, said second grid being printed onto said rub-off coating exactly over the first grid and containing the very same numbers in its boxes as said first grid, whereby, in use, a player owning the game will benefit from two levels of playing activity upon a random drawing of numbers by an authorized authority, namely (1) to try to get a complete horizontal, vertical or diagonal row of numbers as in a BINGO game in order to win a given prize, and simultaneously (2) to scratch the boxes containing the drawn numbers in order to find and win an instant price.

7. The scratch game of claim 6, wherein said substrate is a card and wherein the first and second grids are two-dimensional and comprise a plurality of rows and a plurality of columns.

8. The scratch game of claim 7, further comprising at least one of the following security or control features:

a hidden validation number which is printed on the card and which is specific to said card in order to permit authentification of said card and thus permit the detection of any counterfeiting or partial alteration of the numbers, amounts or symbols printed on the card;

an uncovered control number printed on the card for production control;

dual numbers printed on the card for ascertaining that the first and second grids printed onto the card are identical;

a coded version of a validation number which is specific to the card, said coded version being in the form of bars of different thicknesses.

9. The scratch game of claim 8, wherein the first and second grids have five columns and wherein the word BINGO is printed above said first and second grids in such a manner that each letter of the word BINGO is positioned above one of said five columns.

10. The scratch game of claim 6, wherein the first and second grids have five columns and wherein the word BINGO is printed above said first and second grids in such a manner that each letter of BINGO is positioned above one of said five columns.

11. The scratch game of claim 7, wherein the prizes to be won upon completion of a horizontal, vertical or diagonal row of numbers are printed onto the card.

12. The scratch game of claim 6, wherein the prizes to be won upon completion of a horizontal, vertical or diagonal row of numbers are printed onto the card.

13. The scratch game of claim 10, wherein the prizes to be won upon completion of a horizontal, vertical or diagonal row of numbers are printed onto the card.

*14. A method of manufacturing a scratch game, comprising the steps of:*

*printing a first grid of randomly selected numbers onto a substrate, each number being printed in a separate box forming part of the first grid;*

*applying a scratchable rub-off coating onto the first grid printed on the substrate to hide the numbers printed in the boxes of the first grid; and*

*printing onto said rub-off coating a second grid identical in size to the first grid and containing the same randomly selected numbers, wherein said printings of said first and second grids are synchronized so that the second grid is printed exactly over the first grid and contains the very same numbers in the very same boxes as said first grid.*

*15. The method of claim 14, wherein said substrate is a card, and wherein said first and second grids are two-dimensional and comprise a plurality of rows and a plurality of columns.*

*16. The method of claim 15, comprising the additional step of providing into said card at least one of the following security and control features:*

*printing and hiding a validation number which is specific to said card in order to permit authentification of said card and thus permit the detection of any counterfeiting or partial alteration of the number printed on the card;*

*printing of an uncovered control number for production control;*

*dual numbering of the card with the same number during the printings of the first and second grids to make sure that the synchronization of said grids was perfect when such printings were carried out and that the second grid is identical to the first one; and*

*printing of a coded version of a validation number specific to the card, in the form of bars of different thicknesses.*

*17. The method of claim 16, further comprising additional steps of using first and second grids having five columns and printing over said first and second grids the word BINGO in such a manner that each letter of this word is positioned above one of said five columns.*

*18. The method of claim 15, further comprising additional steps of using first and second grids having five columns and printing over said first and second grids the word BINGO in such a manner that each letter of this word is positioned above one of said five columns.*

*19. The method of claim 14, further comprising additional steps of using first and second grids having five columns and printing over said first and second grids the word BINGO in such a manner that each letter of this word is positioned above one of said five columns.*

*20. In a scratch game comprising a substrate, the combination of:*

*a first grid of randomly selected numbers printed onto the substrate, each number being printed in a separate box which forms part of the first grid;*

*a scratchable rub-off coating applied onto the first grid which hides the numbers printed in the boxes of the first grid; and*

*a second grid which is identical in size to the first grid and containing the same randomly selected numbers as the first grid, said second grid being printed onto said rub-off coating exactly over the first grid and*

*containing the very same numbers in its boxes as said first grid.*

*21. The scratch game of claim 20, wherein said substrate is a card and wherein the first and second grids are two-dimensional and comprise a plurality of rows and a plurality of columns.*

*22. The scratch game of claim 21, further comprising at least one of the following security or control features:*

*a hidden validation number which is printed on the card and which is specific to said card in order to permit authentification of said card and thus permit the detection of any counterfeiting or partial alteration of the numbers, amounts or symbols printed on the card;*

*an uncovered control number printed on the card for production control;*

*dual numbers printed on the card for ascertaining that the first and second grids printed onto the card are identical;*

*a coded version of a validation number which is specific to the card, said coded version being in the form of bars of different thicknesses.*

*23. The scratch game of claim 21, wherein the first and second grids have five columns and wherein the word BINGO is printed above said first and second grids in such a manner that each letter of the word BINGO is positioned above one of said five columns.*

*24. The scratch game of claim 20, wherein the first and second grids have five columns and wherein the word BINGO is printed above said first and second grids in such a manner that each letter of the word BINGO is positioned above one of said five columns.*

*25. The scratch game of claim 22, wherein the first and second grids have five columns and wherein the word BINGO is printed above said first and second grids in such a manner that each letter of the word BINGO is positioned above one of said five columns.*

* * * * *